United States Patent [19]
Stirling et al.

[11] Patent Number: 5,482,548
[45] Date of Patent: Jan. 9, 1996

[54] PIGMENT COMPOSITIONS

[75] Inventors: John A. Stirling, Glasgow; Edward J. Anderson, Kilbarchan; Carol J. Farnocchi, Erskine, all of Scotland

[73] Assignee: Ciba-Geigy Corporation, Tarrytown, N.Y.

[21] Appl. No.: 328,227

[22] Filed: Oct. 25, 1994

[30]  Foreign Application Priority Data

Oct. 28, 1993 [GB] United Kingdom .................... 9322257

[51] Int. Cl.$^6$ .................................................. C09B 41/00
[52] U.S. Cl. .......................... 106/496; 106/437; 106/461; 106/493; 106/504; 106/22 H; 106/23 K
[58] Field of Search ..................... 106/496, 504, 106/437, 461, 493, 23 K, 22 H

[56]   References Cited

U.S. PATENT DOCUMENTS

| | | | |
|---|---|---|---|
| 4,462,833 | 7/1984 | Hays et al. | 106/23 E |
| 4,515,639 | 5/1985 | Dopfer et al. | 106/496 |
| 4,643,770 | 2/1987 | Hays | 106/23 A |

FOREIGN PATENT DOCUMENTS

| | | |
|---|---|---|
| 062304 | 10/1982 | European Pat. Off. . |
| 3336030 | 4/1985 | Germany . |
| 1472781 | 5/1977 | United Kingdom . |

OTHER PUBLICATIONS

Derw. abst. 85–093887/16 of De 3,336,030 Apr. 1985.

*Primary Examiner*—Mark L. Bell
*Assistant Examiner*—Scott L. Hertzog
*Attorney, Agent, or Firm*—Michele A. Kovaleski

[57]    ABSTRACT

The present invention provides a pigment composition comprising a diarylide pigment, a monoprimary amine, a diprimary amine and an inorganic compound having active oxide or hydroxide surfaces.

16 Claims, No Drawings

PIGMENT COMPOSITIONS

The present invention relates to diarylide pigment compositions and to printing inks, especially of the publication gravure type, prepared from such pigment compositions.

Diarylide pigments represent an important class of colouring materials used commonly for the manufacture of printing inks. Pigment Yellow 12 is a widely used member of the group for solvent based publication gravure printing inks and in this it is commonly surface treated to impart certain desirable applicational properties. In this a typical surface treatment agent is a long chain hydrocarbon mine. GB 1085835 teaches that fatty primary amines may be used to treat Pigment Yellow 12 so as to impart good tinctorial strength, gloss transparency and improved rheology. In U.S. Pat. No. 4,515,639 diamines are also used to treat diarylide pigments so as to reduce penetration of inks therefrom into lower quality uncoated paper stock. There are numerous other patents which describe the use of amine treatments to achieve an improved Pigment Yellow 12 for the preparation of publication gravure inks, e.g. U.S. Pat. Nos. 4,643,770, 4,462,833, 4,220,473, 3,905,825, 3,827,902, 3,655,641 and 3,607,861. Also in GB 1472781 there is described the use of white inorganic fillers in combination with hydrocarbon primary amine-treated diarylide pigments to improve penetration with no loss of gloss and strength, the inorganic fillers being precipitated chalk, china clay, blanc fix or talc.

The present invention described the treatment of amine treated diarylide pigments especially Pigment Yellow 12 with specific inorganic compounds with active oxide or hydroxide surfaces resulting in significantly improved gloss and improved tinctorial value in gravure inks.

Accordingly the present invention provides a pigment composition comprising a diarylide yellow pigment, a monoprimary amine, a diprimary amine, and an inorganic compound having active oxide or hydroxide surfaces.

The diarylide pigment compositions of the present invention may be e.g. Pigment Yellow 12, 13, 14, 17, 83, 114, 126, 127 176, Pigment Orange 16 or Pigment Orange 34 or combinations or mixtures of these.

A preferred pigment is Pigment Yellow 12 for its extensive use in solvent based publication gravure printing inks.

The monoprimary amines used to surface treat the pigment compositions of the invention may be primary amines having a long chain alkyl group of 10 to 24 carbon atoms, preferably 12 to 18 carbon atoms. Examples of suitable monoprimary amines include stearylamine, rosin amines, e.g. amine derivatives of wood resin (®Rosin Amine D), N-long chain alkylalkylene diamines (®Duomeens), polyamines, e.g. N-cocotrimethylene diamine-N'-propylamine, polyamide/polyamine derivatives (®Merginamide) beta-amines (®Armeen L11 ). Especially preferred is N-alkyl polypropylene polyamine (®Inipol PS) in which the number of carbon atoms in the alkyl chain falls predominantly in the range $C_{16}$-$C_{18}$.

The diprimary amine may be a compound having the general formula I

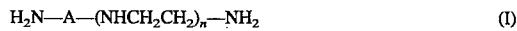

$$H_2N-A-(NHCH_2CH_2)_n-NH_2 \quad (I)$$

in which A is an alkylene group having 2 to 8 carbon atoms and n is from 0 to 8.

Examples of such compounds are 1,3-diaminopropane, 1,4-diaminobutane, 1,8-diaminooctane, methyl iminobispropylamine, diethylene triamine and pentaethylene hexamine. Particularly preferred is tetra ethylene pentamine (TEPA).

The inorganic compounds added in combination with the above described amines to complete the diarylide pigment composition, and provide the active oxide or hydroxide surfaces are compounds of metals, e.g. titanium; aluminium, magnesium, zinc, tin, iron and nickel/antimony mixtures. Of especial value are commercial grades of titanium dioxide (2®Tioxide R-CR, RCR6, RHD2, RCR90, RCR92 and ®Tiona 472 and ®Kronos 2063).

The compounds having active oxide or hydroxide surfaces may be added as such or formed in situ. For example salts of the metal may be used and the mixture rendered alkaline to precipitate the oxide or hydroxide. Suitable salts include magnesium sulphate and aluminium sulphate. Mixture of compounds may be used if desired.

These inorganic compounds may be added before, during or after completion of the pigment synthesis but preferably after the addition of the cliamine e.g. TEPA is complete and prior to isolation of the pigment composition.

The diarylide pigment compositions of the present invention may be prepared by tetrazotising 3,3'-dichlorobenzidine and coupling with one or more components such as acetoacetanilide, acetoacet-2-toluidine, acetoacet-2-chloroanilide, acetoacet-2,4-xylide and acetoacet-2,5-dimethoxy-4-chloroanilide in water.

Addition of monoprimary and/or diprimary mines may be made before, during or after pigment synthesis. Preferably the synthesis coupling is carried out in the presence of diprimary amine (e.g. TEPA) and the monoprimary amine may be added after syntheses is complete. Along with the monoprimary amine, any shading agent which may be desirable may be added, e.g. Pigment Orange 34. The inorganic compound may then be added to complete the composition.

The amount of monoprimary amine may be from 5–30% by weight of diarylide pigment and preferably from 15 to 25% by weight. The amount of diprimary amine may be from 1 to 15% by weight based on the weight of pigment and preferably 1.5 to 8% by weight. The amount of inorganic compound may be from 0.1 to 10% by weight based on the weight of the pigment, and preferably from 2.5 to 10% by weight.

Publication gravure inks prepared from these compositions show outstanding improvements in gloss and significant improvements in tinctorial strength.

EXAMPLE 1

A tetrazonium salt solution is prepared by stirring to a smooth paste 32.6 parts of $3,3^1$-dichlorobenzidine dihydrochloride in 250 parts of water containing 40 parts of concentrated hydrochloric acid (36%) and then tetrazotising with 13.8 parts of sodium nitrite dissolved in 25 parts of water. Whilst maintaining the temperature between 0° and 5° C. The tetrazonium salt solution is clarified by adding 1 part of activated charcoal and subsequently filtering the final volume of the tetrazonium salt solution is adjusted to 800 parts with water, at a temperature between 0° and 5° C.

A suspension of coupling component is prepared by dissolving 47.5 parts of acetoacetanilide and 22.6 parts of sodium hydroxide (47%) in 465 parts of water and then adding to this, slowly, a solution of 18.5 parts of glacial acetic acid in 135 parts of water, whilst stirring vigorously. 4.5 parts of tetraethylenepentamine in 180 parts of water are added slowly to the coupling component suspension.

The coupling reaction is carried out by means of a gradual addition of the tetrazotised diichlorobenzidine to the suspension of the precipitated coupling component maintaining the pH between 4.5 and 5.5 and the temperature controlled by the addition of ice to between 15° and 25° C.

A solution of 13.1 parts of N-alkyl polypropylene polyamine (®Inipol PS) and 3 parts of glacial acetic acid in 290 parts of water is prepared by heating the mixture with stirring to 80° C. 1.2 parts of Pigment Orange 34 and 4.5 parts of titanium dioxide are added and the mixture stirred for 5 minutes on a SILVERSON stirrer before being added to the coupled slurry.

The temperature of the slurry is raised to 90°–95° C. and held for 10 minutes before increasing to pH 11.0 by addition of 15% sodium hydroxide solution. The slurry is cooled to 70° C. by addition of cold water. Filtered under suction, and washed with water until the flitrate shows a conductivity level of less than 500 μs.

The product is dried for 20 hours at 80° C. and then ground through a 250 μm screen.

EXAMPLES 2 TO 4

Example 1 is repeated except that the titanium dioxide is replaced by an equal amount of the following compounds:

| EXAMPLE | COMPOUND |
| --- | --- |
| 2 | Magnesium sulphate |
| 3 | Butyl titanate |
| 4 | Aluminium sulphate |

EXAMPLES 5 TO 7

Inks are made from the pigment compositions from Examples 1, 2 and 3 and a comparison using a pigment as in Example 1 except that there is no titanium dioxide present.

The inks are made by adding to a honey jar 200 g 10 mm Steatite balls, 56.7 g mixed metal resinate in toluene, 26.6 g toluene and 16.7 g pigment. The mixture is ball-milled for 4 hours at 116 rpm. The mill-base is poured off and the flow measured with a Shell Cup No. 2. The final ink is made up to 16 seconds through a Shell Cup No. 2 by reducing with toluene.

The ink is then drawn down with a K-bar. The strength is assessed using a Gretag D 152 Densitometer and the gloss is assessed using an Erichsen portable glossmeter. In the results given in the Table below the strength and gloss of the comparison ink is given as 100% so that any figure above 100% shows an improvement. It can be seen that in each case the ink according to the invention shows a higher strength and improved gloss.

| Results Table | | | |
| --- | --- | --- | --- |
| Example | Pigment | Strength (%) | Gloss (%) |
| — | Comparison | 100 | 100 |
| 5 | Example 1 | 105 | 127 |
| 6 | Example 2 | 110 | 125 |
| 7 | Example 3 | 105 | 128 |

We claim:

1. A pigment composition comprising a diarylide pigment, a monoprimary amine, a diprimary amine and an inorganic compound having active oxide or hydroxide surfaces.

2. A composition as claimed in claim 1 in which the diarylide pigment is Pigment Yellow 12.

3. A composition as claimed in claim 1 in which the monoprimary amine is one having a long chain alkyl group of 10 to 24 carbon atoms.

4. A composition as claimed in claim 1 in which the diprimary amine is one having the general formula I $$H_2N-A-(NHCH_2CH_2)_n-NH_2 \qquad (I)$$

in which A is an alkylene group having 2 to 8 carbon atoms and n is from 0 to 8.

5. A composition as claimed in claim 4 in which the diprimary amine is tetraethylene pentamine.

6. A composition as claimed in claim 1 in which the inorganic compound having active oxide or hydroxide surfaces is added as such or formed in situ.

7. A composition as claimed in claim 6 in which the inorganic compound is, or is derived from titanium dioxide, magnesium sulphate, aluminium sulphate or butyl titanate.

8. A composition as claimed in claim 1 in which the amount of monoprimary amine is from 5 to 30% by weight of pigment.

9. A composition as claimed in claim 8 in which the mount of monoprimary mine is from 15 to 25% by weight of pigment.

10. A composition as claimed in claim 1 in which the mount of diprimary mine is from 1 to 15% by weight of pigment.

11. A composition as claimed in claim 10 in which the mount of diprimary mine is from 1.5 to 8% by weight of pigment.

12. A composition as claimed in claim 1 in which the mount of inorganic compound is from 0.1 to 10% by weight of pigment.

13. A composition as claimed in claim 12 in which the mount of inorganic compound is from 2.5 to 10% by weight of pigment.

14. A process for preparing a pigment composition as claimed in claim 1 which comprises adding the monoprimary amine, diprimary mine and inorganic compound to the pigment before, during or after completion of the pigment synthesis.

15. A process as claimed in claim 14 in which the pigment synthesis is carded out in the presence of a diprimary mine, a monoprimary amine is added after the synthesis is complete, followed by addition of the inorganic compound.

16. An ink containing, as colourant, a pigment composition as claimed in claim 1.

* * * * *